United States Patent [19]

Yamamoto et al.

[11] Patent Number: 4,699,661

[45] Date of Patent: Oct. 13, 1987

[54] REFRACTORY COMPOSITION

[75] Inventors: Shin Yamamoto; Hiroshi Nishikura, both of Kakogawa, Japan

[73] Assignee: Taki Chemical Co., Ltd., Kakogawa, Japan

[21] Appl. No.: 640,458

[22] Filed: Aug. 13, 1984

[30] Foreign Application Priority Data

Sep. 19, 1983 [JP] Japan .................................. 58-173358

[51] Int. Cl.$^4$ ................................................ C08L 1/00
[52] U.S. Cl. ..................................... 106/162; 501/109; 501/119
[58] Field of Search ................. 501/109, 119; 106/162

[56] References Cited

U.S. PATENT DOCUMENTS 4,102,691  7/1978  Walters et al. ....................... 501/109

FOREIGN PATENT DOCUMENTS 3431951  4/1985  Fed. Rep. of Germany ...... 501/109
1478317  6/1977  United Kingdom ................ 501/109

*Primary Examiner*—Mark L. Bell
*Assistant Examiner*—Steven Capella
*Attorney, Agent, or Firm*—Wenderoth, Lind & Ponack

[57] ABSTRACT

A binder for producing a refractory body made of a basic aluminum lactate and polyethylene glycol, the latter material of which functions to prevent shrinkage of the molded product upon hardening and prevent cracks. Alkanolamines and an aromatic carboxylic acids may be further added to enhance the properties of the polyethylene glycol in preventing cracks.

13 Claims, No Drawings

REFRACTORY COMPOSITION

The present invention relates to a binder for producing a refractory body, particularly produced with a basic aggregate.

A binder in the field of refractory body has a long history, during which many binders such as alkali metal silicate, silica sol, alumina sol, basic aluminum chloride, alumina cement, various phosphates and the like have been developed and are now in practical use.

Of these binders, alkali metal silicate contains an alkali metal, showing a reduction in bond strength at high temperatures, and silica sol and alumina sol, although they are used in special fields, are generally short of bond strength over the whole region extending from low to high temperatures.

The basic aluminum chloride is an excellent binder, but evolves a chlorine gas at high temperatures, so that it is not desirable in terms of operation. With alumina cement, fair amounts need to be used when it is used together with medium-acidity aggregates, and as a result, the molded product contains calcium in large amounts to produce low-melting substances. As to the phosphate which is a binder superior in strength developed in recent years, when it is used, for example, in the wall material of ladles, etc., there is actually caused a problem of the phosphate component contaminating the molten metal as impurities.

That is, any of these binders has both merits and demerits, thus strict selection of substances to be bound or uses being unavoidable. And with some of them, a fair consideration should be given to their stability and workability.

Further, as to basic aggregates such as magnesia clinker, etc., a suitable binder for their use has not so far been found in spite of their excellent refractoriness.

In view of the present situation like this, the present inventors extensively studied and found that basic aluminum lactate is excellent binder (Japanese Patent Application No.161867/1981), but it became clear that, when this binder is mixed with an aggregate, molded and dried, shrinkage of the molded product is caused and besides fine cracks are generated.

As a result of a further study to solve this problem, the present inventors found that, by using basic aluminum lactate and polyethylene glycol in combination, the shrinkage of the molded product on hardening after molding of a refractory body as well as the generation of fine cracks on drying can be prevented, and besides an explosion inhibiting effect on rise in temperature owing to prevention of the basic aggregate from hydration can be obtained. Further, it was found that, by using basic aluminum lactate, polyethylene glycol and an alkanolamine in combination, or basic aluminum lactate, polyethylene glycol and an aromatic carboxylic acid in combination, these effects are further more displayed. The present inventors thus completed the present invention.

The basic aluminum lactate used in the present invention refers to a one having a composition that the molar ratio of $Al_2O_3$ to lactic acid is 0.2 to 2.0. It can be produced, as described in Japanese Patent Kokai No. 63770/1983, by reacting a water-soluble aluminum salt with the carbonate or hydrogencarbonate of an alkali metal or ammonium, or reacting aluminum aluminate with a carbon dioxide gas to deposit aluminum hydrate which is then dissolved in lactic acid. Also, ammonium hydroxide and sodium hydroxide may be used in place of said carbonate.

Also, the basic aluminum lactate can be produced by adding to a mixed solution of aluminum sulfate and lactic acid or aluminum lactate a compound forming a water-insoluble sulfate such as calcium compounds, barium compounds, etc.

In using this basic aluminum lactate, it may be used as a solution or a powder after drying.

The present invention uses basic aluminum lactate of the composition as mentioned above and polyethylene glycol, or said basic aluminum lactate, polyethylene glycol and an alkanolamine, or said basic aluminum lactate, polyethylene glycol and an aromatic carboxylic acid. Polyethylene glycol used in the present invention is a one having an average molecular weight of 200 to 20000.

As the alkanolamine used in the present invention, there are given monoethanolamine, triethanolamine, diethanolamine,
and the like, of which monoethanolamine is most preferred in terms of effect.

As the aromatic carboxylic acid, there are given benzoic acid, salicylic acid, sulfosalicylic acid, aminobenzoic acid and the like, of which salicylic acid is most preferred in terms of effect.

The proportion of the amounts of these compounds varies with the basicity of basic aluminum lactate, kind of the compounds described above, kind of substances to be bound, uses and the like. First, in case where basic aluminum lactate and polyethylene glycol are used, it is preferred that the amount of polyethylene glycol is approximately 30 to 350% by weight based on basic aluminum lactate converted to the amount of $Al_2O_3$.

In using basic aluminum lactate and polyethylene glycol, the effect of the present invention is further more displayed by using the alkanolamine or aromatic carboxylic acid together.

When the alkanolamine is used together, it is preferred that the amounts of polyethylene glycol and alkanolamine are approximately 30 to 350% by weight and 10 to 200% by weight, respectively, based on basic aluminum lactate converted to the amount of $Al_2O_3$.

When the aromatic carboxylic acid is used together, it is preferred that the amounts of polyethylene glycol and aromatic carboxylic acid are approximately 30 to 350% by weight and 10 to 200% by weight, respectively, based on basic aluminum lactate converted to the amount of $Al_2O_3$.

When these amounts are below the lower limit of the ranges described above, as compared with the use of basic aluminum lactate alone, the effects to prevent the shrinkage of molded products and generation of fine cracks as well as the explosion inhibiting effect on rise in temperature owing to inhibition of basic aggregates from hydration cannot be expected to a large extent. While, when said amounts exceed the upper limit of the ranges described above, there occurs a problem that the amounts are too large so that the bond strength of the molded product after sintering is reduced.

Polyethylene glycol used is a one having an average molecular weight of 200 to 20000. Hereupon, the average molecular weight was determined as 200 to 20000 for the reason that the amount of polyethylene glycol depends upon the molecular weight thereof.

The amount of polyethylene glycol generally increases as a decrease in the molecular weight, but when the average molecular weight is below 200, the foregoing effects can hardly be expected even by increasing the amount.

While, when the average molecular weight exceeds 20000, sufficiently uniform mixtures of basic aluminum lactate and an aggregate cannot be obtained because there occurs a problem that workability on mixing of the both becomes poor, as a result of which the bond strenght is reduced.

In the present invention, it was found that, by using basic aluminum lactate together with these compounds, the shrinkage of molded products on hardening thereof as well as generation of fine cracks are prevented, and besides the explosion inhibiting effect on rise in temperature owing to inhibition of basic aggregates from hydration is displayed, as a result of which bond strength superior as refractory compositions is displayed. But, such effects to prevent the shrinkage of molded products and generation of fine cracks as described in the present invention were not found at all with other compounds such as glycerin, triethylene glycol, starch, PVP, pyrrolidone, silicone, corn starch and the like.

In practicing the present invention, the binder of the present invention may be used together with other ones such as silica sol, aluminum phosphate, alumina cement, etc., or in order to make the bond strength further large, it may be used together with active aluminum hydroxide, silica flour, etc.

Next, the present invention will be illustrated with reference to the following examples, but it is not to be interpreted as being limited to the examples only.

Also, the following examples of the present invention principally take up the case of basic aggregates, but it is a matter of course that the present invention is also applicable to acidic aggregates and medium-acidity ones such as pyrophyllite, zircon flour, silica sand, etc. from its technical contents.

In the examples of the present invention, all percents are by weight unless otherwise stated.

EXAMPLE 1

TABLE 1

| Aggregate | Particle diameter (m/m) | Mixing rate (part) |
| --- | --- | --- |
| Magnesia clinker | 4.76-2.00 | 26 |
| | 2.00-0.71 | 25 |
| | 0.71-0.088 | 15 |
| | Less than 0.088 | 34 |

To 40 parts of basic aluminum lactate powder ($Al_2O_3$/lactic acid molar ratio, 0.33; $Al_2O_3$ content, 19.2%) were added 10 parts of polyethylene glycol powder (average molecular weight, 2000) and 75 parts of water to make a solution. This solution was added to and kneaded with 1000 parts of the basic aggregate shown in Table 1.

For comparison, to 40 parts of basic aluminum lactate powder of the same composition as above were added 10 parts of a triethylene glycol solution and 64 parts of water to make a solution. This solution was added to and kneaded with 1000 parts of the basic aggregate shown in Table 1.

The kneaded products were each run into a mold of 40×40×160 m/m and removed therefrom after 10 hours, and the molded products obtained were dried at 110° C. for 24 hours.

After drying, the surface state and percent linear shrinkage of the molded product were measured, and thereafter, the bending strength was measured on a bending strength tester. Also, the cold bending strength after 2 hours' calcination at 1000° C. was measured. The results are shown in Table 2.

TABLE 2

| | Cold bending strength (kg/cm$^2$) | | 110° C.-Dried body | |
| --- | --- | --- | --- | --- |
| | 110° C. | 1000° C. | Surface state | Percent linear shrinkage (%) |
| Present example | 56 | 20 | No cracks | 0.37 |
| Comparative example | 39 | 11 | Cracks are observed. | 1.25 |

EXAMPLE 2

Twenty parts of polyethylene glycol powder (average molecular weight, 7500) was dissolved in 100 parts of a basic aluminum lactate solution ($Al_2O_3$/ lactic acid molar ratio, 0.6; $Al_2O_3$ content, 10.0%), and the solution obtained was added to and kneaded with 1000 parts of the basic aggregate shown in Table 1 described above.

For comparison, 2 parts and 40 parts of polyethylene glycol powder (average molecular weight, 7500) were each dissolved in 100 parts of a basic aluminum lactate solution of the same composition as above, and the solutions obtained were each added to and kneaded with 1000 parts of the basic aggregate shown in Table 1 described above. In this case, when 40 parts of polyethylene glycol powder was dissolved in the basic aluminum lactate solution, the solution did not turn complete solution, but took a slurry form.

The solutions were each run into a mold of 40×40×160 m/m and removed therefrom after 10 hours, and the molded products obtained were dried at 110° C. for 24 hours. After measuring the percent linear shrinkage of the dried products, the cold bending strength at 800° C. and hot bending strength at 1200° C. were measured. The results are shown in Table 3.

TABLE 3

| | Amount of polyethylene glycol added (wt. %) based on $Al_2O_3$) | Cold bending strength at 800° C. (kg/cm$^2$) | Hot bending strength at 1200° C. (kg/cm$^2$) | Percent linear shrinkage of dried product (%) |
| --- | --- | --- | --- | --- |
| Present example | 200 | 25 | 4.2 | 0.25 |
| Comparative example | 20 | 13 | 2.8 | 1.07 |
| | 400 | 19 | 3.7 | 0.29 |

EXAMPLE 3

TABLE 4

| Aggregate | Particle diameter (m/m) | Mixing rate (part) |
| --- | --- | --- |
| Magnesia clinker | 4.76-2.00 | 38 |
| | 2.00-0.71 | 25 |
| | 0.71-0.088 | 15 |
| | Less than 0.088 | 22 |

To 50 parts of basic aluminum lactate powder ($Al_2O_3$/lactic acid molar ratio, 0.40; $Al_2O_3$ content, 27%)

were added 10 parts of polyethylene glycol powder (average molecular weight, 3000) and 63 parts of water to make a solution. Separately from this, a solution comprising 50 parts of basic aluminum lactate powder of the same composition as above, 10 parts of polyethylene glycol powder (average molecular weight, 20000) and 63 parts of water, and a solution comprising 50 parts of basic aluminum lactate powder of the same composition as above, 10 parts of a polyethylene glycol solution (average molecular weight, 400) and 55 parts of water were prepared in the same manner as above.

These solutions were each added to and kneaded with 1000 parts of the basic aggregate shown in Table 4, run into a mold of 40×40×160 m/m and removed therefrom after 24 hours, and the molded products obtained were dried at 110° C. for 24 hours. After drying, the bending strength and percent linear shrinkage were measured, and then the surface state was observed. The results are shown in Table 5.

TABLE 5

| Molecular weight of polyethylene glycol | Bending strength (kg/cm$^2$) | Percent linear shrinkage (%) | Surface state |
|---|---|---|---|
| 3000 | 51 | 0.34 | No cracks |
| 20000 | 55 | 0.29 | No cracks |
| 400 | 43 | 0.62 | Fine cracks are observed a little. |

EXAMPLE 4

To 40 parts of the same basic aluminum lactate powder as used in Example 1 were added 10 parts of polyethylene glycol powder (average molecular weight, 2000), 5 parts of monoethanolamine and 70 parts of water to make a solution.

A solution was made in the same manner as above but using 5 parts of triethanolamine in place of 5 parts of monoethanolamine.

Further, for comparison, a solution comprising 40 parts of basic aluminum lactate powder of the same composition as above, 10 parts of glycerin and 60 parts of water, and a solution comprising 40 parts of basic aluminum lactate powder of the same composition as above and 80 parts of a 7% starch solution were prepared in the same manner as above.

These solutions were each added to and kneaded with 1000 parts of the basic aggregate shown in Table 1, run into a mold of 40×40×160 m/m and removed therefrom after 24 hours, and the molded products obtained were dried at 110° C. The bending strength and percent linear shrinkage of the dried products were measured, and then the surface state was observed. The results are shown in Table 6.

TABLE 6

| | Compound added | Bending strength (kg/cm$^2$) | Percent linear shrinkage (%) | Surface state |
|---|---|---|---|---|
| Present example | Monoethanolamine + polyethylene glycol | 66 | 0.15 | No cracks |
| | Triethanolamine + polyethylene glycol | 63 | 0.14 | No cracks |
| Comparative example | Glycerin | 36 | 1.10 | Cracks are observed. |
| | Starch | 30 | 1.52 | Many cracks are observed. |

EXAMPLE 5

To 30 parts of basic aluminum lactate powder (Al$_2$O$_3$/lactic acid molar ratio, 0.29; Al$_2$O$_3$ content, 18.9%) were added 17 parts of polyethylene glycol powder (average molecular weight, 1000) and 65 parts of water to make a solution. Separately from this, a solution comprising 30 parts of basic aluminum lactate powder of the same composition as above, 17 parts of polyethylene glycol powder (average molecular weight, 1000), 2 parts of salicylic acid and 65 parts of water, a solution comprising 30 parts of the same basic aluminum lactate as above, 17 parts of polyethylene glycol powder (average molecular weight, 1000), 2 parts of benzoic acid and 65 parts of water, and a solution comprising 30 parts of the same basic aluminum lactate as above, 17 parts of polyethylene glycol powder (average molecular weight, 1000), 10 parts of monoethanolamine and 57 parts of water were prepared in the same manner as above.

These solutions were each added to and kneaded with 1000 parts of the basic aggregate shown in Table 4, run into a mold of 40×40×160 m/m and removed therefrom after 24 hours. After drying, the percent linear shrinkage of the dried products was measured, and thereafter, the cold bending strength after 2 hours' calcination at 500° C. was measured.

Separately from this, hardening of the molded products removed from the mold was confirmed by finger touch to measure the hardening time, and then the hardened products were placed, without drying, in an electric oven of 500° C. to examine the occurrence of explosion.

The results are shown in Table 7.

TABLE 7

| Compound added | Hardening time at 30° C. (hr) | Percent linear shrinkage of dried product (%) | Cold bending strength at 500° C. (kg/cm$^2$) | Explosion at 500° C. |
|---|---|---|---|---|
| Polyethylene glycol | 10 | 0.30 | 32 | None |
| Polyethylene glycol + salicylic acid | 7 | 0.13 | 37 | None |
| Polyethylene glycol + benzoic acid | 8 | 0.19 | 40 | None |
| Polyethylene glycol + | 12 | 0.09 | 37 | None |

TABLE 7-continued

| Compound added | Hardening time at 30° C. (hr) | Percent linear shrinkage of dried product (%) | Cold bending strength at 500° C. (kg/cm$^2$) | Explosion at 500° C. |
|---|---|---|---|---|
| monoethanolamine | | | | |

The percent linear shrinkage of the dried products, as shown in Table 7, becomes small by adding salicylic acid, benzoic acid or monoethanolamine.

Particularly, in the period of ageing beginning about three hours after kneading and running into a mold in which period pseudohardening of the molded product began, a little shrinkage was noticed for the addition of polyethylene glycol alone, but little shrinkage in the ageing period was noticed for the addition of polyethylene glycol and any of salicylic acid, benzoic acid and monoethanolamine.

What is claimed is:

1. A binder for producing a refractory body consisting essentially of basic aluminum lactate and polyethylene glycol.

2. A binder for producing a refractory body as described in claim 1, wherein the amount of polyethylene glycol used is 30 to 350% by weight based on the amount of Al$_2$O$_3$ in the basic aluminum lactate.

3. A binder for producing a refractory body as described in claim 1, wherein the average molecular weight of polyethylene glycol is 200 to 20000.

4. A binder for producing a refractory body consisting essentially of basic aluminum lactate, polyethylene glycol and an alkanolamine.

5. A binder for producing a refractory body as described in claim 4, wherein the amount of polyethylene glycol used is 30 to 350% by weight based on the amount of Al$_2$O$_3$ in the basic aluminum lactate.

6. A binder for producing a refractory as described in claim 4, wherein the amount of alkanolamine used is 10 to 200% by weight based on the amount of Al$_2$O$_3$ in the basic aluminum lactate.

7. A binder for producing a refractory body as described in claim 4, wherein the alkanolamine is monoethanolamine.

8. A binder for producing a refractory body as described in claim 4, wherein the average molecular weight of polyethylene glycol is 200 to 20000.

9. A binder for producing a refractory body consisting essentially of basic aluminum lactate, polyethylene glycol and an aromatic carboxylic acid.

10. A binder for producing a refractory body as described in claim 9, wherein the amount of polyethylene glycol used is 30 to 350% by weight based on the amount of Al$_2$O$_3$ in the basic aluminum lactate.

11. A binder for producing a refractory body as described in claim 9, wherein the amount of the aromatic carboxylic acid used is 10 to 200% by weight based on the amount of Al$_2$O$_3$ in the basic aluminum lactate.

12. A binder for producing a refractory body as described in claim 9, wherein the aromatic carboxylic acid is salicylic acid.

13. A binder for producing a refractory body as described in claim 9, wherein the average molecular weight of polyethylene glycol is 200 to 20000.

* * * * *